US007009147B1

(12) United States Patent
Schulte

(10) Patent No.: US 7,009,147 B1
(45) Date of Patent: Mar. 7, 2006

(54) OPERATIONAL MODES FOR A COOKING APPLIANCE EMPLOYING COMBINATION COOKING TECHNOLOGY

(75) Inventor: Robert A. Schulte, Williamsburg, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 11/033,556

(22) Filed: Jan. 12, 2005

(51) Int. Cl.
*H05B 1/02* (2006.01)
*H05B 6/68* (2006.01)
*A21B 1/40* (2006.01)

(52) U.S. Cl. ...................... 219/400; 219/413; 219/492; 219/497; 219/702; 219/719; 99/468

(58) Field of Classification Search ..................... None
See application file for complete search history.

(56) References Cited

U.S. PATENT DOCUMENTS

| | | | | |
|---|---|---|---|---|
| 3,627,959 | A | 12/1971 | Chapell | |
| 3,784,776 | A | 1/1974 | Asanuma | |
| 3,823,294 | A | 7/1974 | Takayama et al. | |
| 4,054,769 | A | 10/1977 | Anderson et al. | |
| 4,096,370 | A | 6/1978 | Duncan | |
| 4,117,294 | A | 9/1978 | Appelquist et al. | |
| 5,293,020 | A | 3/1994 | Han et al. | |
| 6,087,643 | A * | 7/2000 | Park | 219/719 |
| 6,331,699 | B1 * | 12/2001 | Ito et al. | 219/715 |
| 6,337,468 | B1 | 1/2002 | Worthington et al. | |
| 6,521,870 | B1 | 2/2003 | Nolan et al. | |
| 6,528,772 | B1 | 3/2003 | Graves et al. | |
| 6,570,138 | B1 * | 5/2003 | Hansen et al. | 219/497 |
| 2003/0024925 | A1 | 2/2003 | Graves et al. | |

FOREIGN PATENT DOCUMENTS

| | | |
|---|---|---|
| DE | 3236290 | 4/1984 |
| EP | 397209 | 11/1990 |
| EP | 456846 | 11/1991 |
| EP | 550897 | 7/1993 |
| JP | 2000164336 A * | 6/2000 |

* cited by examiner

*Primary Examiner*—Joseph Pelham
(74) *Attorney, Agent, or Firm*—Diederiks & Whitelaw, PLC

(57) ABSTRACT

A cooking appliance includes a controller for establishing a plurality of operating modes for heating an oven cavity. Specifically, the controller establishes one of a pre-heat mode, a ready mode, a first low power mode and a second low power mode for controlling a temperature of the oven cavity. Upon selecting a temperature for the oven cavity, the controller operates a radiant heating device, a convection fan and a convection heating device at full power to establish the selected temperature. After the selected temperature is achieved, the controller switches to a ready mode and reduces heat output of both the radiant heating device and the convection heating device, while also reducing fan speed. After respective periods of time in which a door of the appliance is not opened, the controller switches to first and second low power modes to conserve energy.

38 Claims, 8 Drawing Sheets

OPERATIONAL MODES FOR A COOKING APPLIANCE EMPLOYING COMBINATION COOKING TECHNOLOGY

BACKGROUND OF THE INVENTION

1. Field of the Invention

The present invention pertains to the art of cooking appliances and, more particularly, to operating various heating devices in a cooking appliance to maintain a selected temperature and, if no cooking operation is initiated for a predetermined period of time, automatically lowering the selected temperature to conserve energy.

2. Discussion of the Prior Art

In general, it is known to combine various heating techniques to establish a particular temperature in a cooking appliance. That is, once a particular cooking temperature is selected and input into the appliance by a consumer, the various heating techniques are operated singly or in combination to heat an oven cavity to achieve the selected temperature. In many cases, during an initial pre-heat mode, the heating devices are operated at full power to achieve the selected temperature in a short period of time. After the selected temperature has been achieved, the heating devices are thereafter operated so as to maintain the selected temperature in the oven cavity. More specifically, the heating devices are again operated singly or in various combinations to maintain the temperature in the oven cavity between predetermined, upper and lower temperature limits established based on the selected temperature.

If the cooking operation is not started within a short period of time after completion of the pre-heat mode, a considerable amount of energy is wasted in order to maintain the oven cavity at the selected temperature. That is, if a consumer becomes distracted or, for whatever reason, cannot start cooking, the oven will continue to operate the heating devices in an effort to maintain the selected temperature indefinitely. In a commercial environment, often times the oven is started early and then used only periodically during the day. That is, in order to avoid the time delay associated with pre-heating the oven cavity, the oven is typically turned on at the beginning of daily operations and not shut off until the end of the day. Even though the oven may only be used periodically during a given shift, it would be impractical to turn the oven on and off, as the delay required for pre-heating the oven would delay the preparation and presentation of meals to the consumer. Therefore, particularly in commercial environments, a great deal of energy is lost maintaining the cooking appliance at the selected temperature.

Based on the above, there exists a need in the art for a cooking appliance that operates in a manner so as to conserve energy. More specifically, there exists a need for an appliance that controls operation of various heating elements in order to establish a selected temperature for an oven cavity and, if no cooking operation is initiated for a predetermined period of time, automatically reduces operation of the heating elements to conserve energy.

SUMMARY OF THE INVENTION

The present invention is directed to operating a cooking appliance using combined cooking techniques. In accordance with a preferred embodiment, the cooking appliance includes a cabinet within which is established an oven cavity having top, bottom, rear and opposing side walls that define a frontal opening, and a door for selectively closing the frontal opening. In accordance with the invention, the cooking appliance combines various heating devices to establish and maintain a selected temperature in the oven cavity. More specifically, a radiant heating device, a convection fan and a convection heating device are operated to heat the oven cavity to a temperature selected through a control element or a temperature set by a controller based upon a particular operational mode.

In accordance with a preferred embodiment of the present invention, once a particular temperature is selected, the controller initiates a pre-heat mode. During the pre-heat mode, the radiant heating device and convection fan can be set to any desired power level, while the convection heater is preferably operated at full power in order to rapidly establish the selected temperature. In one preferred embodiment, the radiant heating device and convection heating device are operated at full power and the convection fan is operated at full speed. Once the selected temperature is reached, the controller automatically transitions to a ready mode of operation. During the ready mode, the controller reduces the heat output by both the radiant heating device and the convection heating device while, at the same time, lowering the speed of the convection fan in order to maintain the selected temperature. The controller then maintains the temperature of the oven cavity between upper and lower limits that establish an average value approximating the selected temperature.

If the door is not opened within predetermined period of time, the controller automatically switches to operating in a first low power mode. More specifically, the controller reads a signal that the door was opened as a sign indicating that a food item was placed in the oven cavity. If the door is not opened, maintaining the selected temperature would waste a considerable amount of energy. In any event, during the first low power mode, the controller operates the heating devices and fan in a manner that establishes a lower temperature for the oven cavity. In the first low power mode, heat output by the radiant heating device and convection heating device is reduced, and the convection fan speed is lowered so as to maintain oven cavity temperature at a level below the selected temperature. In a manner similar to that described above, oven cavity temperature is maintained between upper and lower limits which establish an average value that approximates a first low power setting. In accordance with the invention, the first low power setting is lower than the average value of the selected temperature.

In accordance with the most preferred embodiment of the present invention, if the door is not opened after another predetermined period of time, the controller automatically transitions to a second low power mode of operation. During the second low power mode, the heat output by the heating devices and the speed of the convection fan are further reduced below the level set for the first low power mode. The reduction of heat output and fan speed establishes an even lower temperature for the oven cavity. In general, the controller automatically establishes upper and lower temperature limits that are below those employed in the first low power mode.

In further accordance with the most preferred embodiment of the invention, the controller reduces heat output by the radiant heating device and the speed of the convection fan by phase firing one or more semi-conductor devices. On the other hand, the heat output by the convection heating device is reduced through cycling of a relay. In addition, if the door is opened during either the ready mode or the first low power mode, the heating devices and fan are operated to re-establish the selected temperature and control inputs can be used to set, for example, a cook time. On the other hand, if the door is opened in the second low power mode, control inputs are locked out until the oven cavity re-establishes the selected temperature. In still further accordance with the most preferred embodiment of the invention, the upper and lower temperature limits for each of the ready mode, first low power mode and second low power mode are pre-set in the controller. However, each of these temperature limits may be adjusted by the consumer. In addition, the first and second low power mode temperatures, as well as the predetermined periods of time, can be adjusted by a consumer to suit particular needs.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
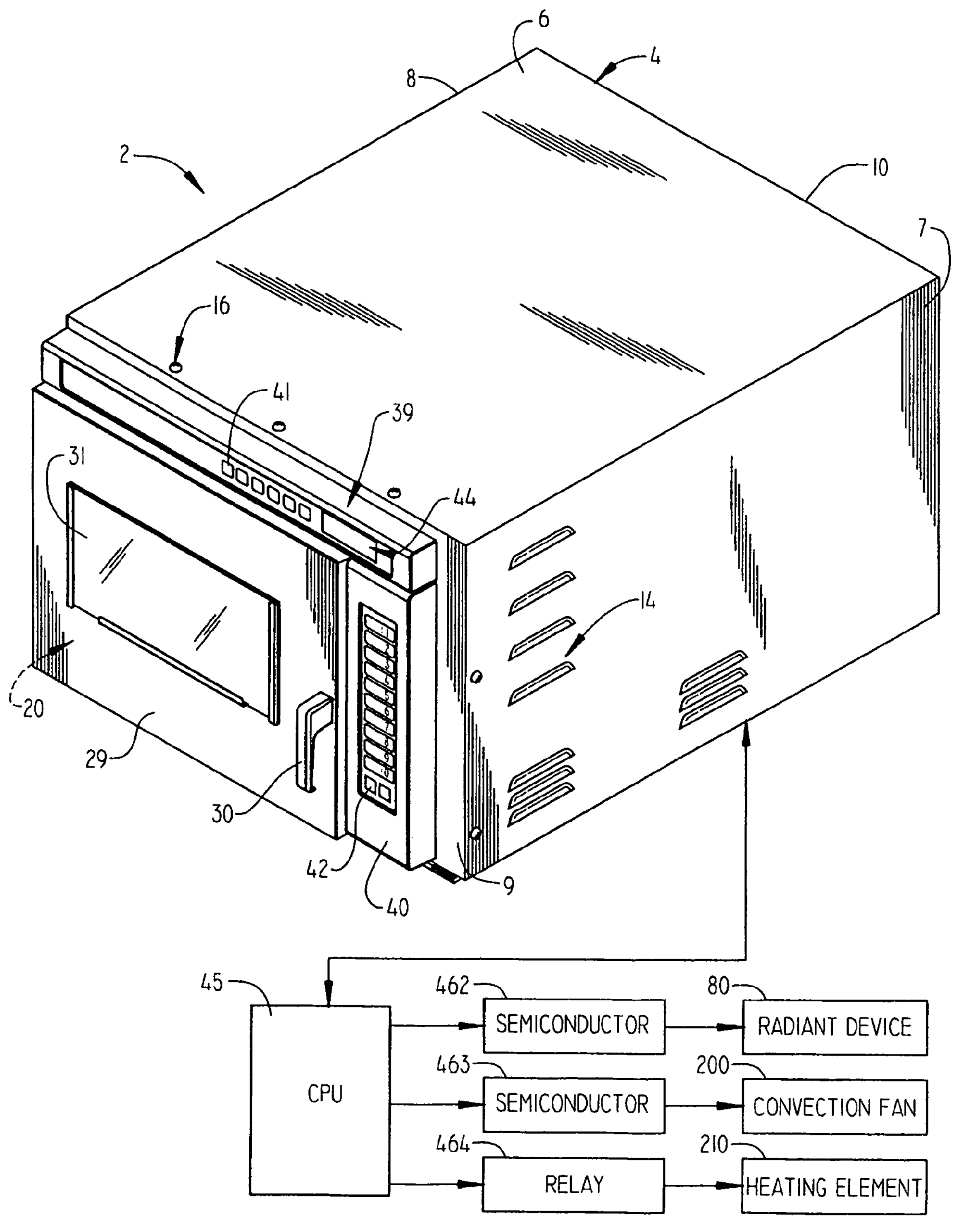
FIG. 1 is an upper right perspective view of a cooking appliance incorporating a combination heating system constructed in accordance with the present invention.
Figure 2:
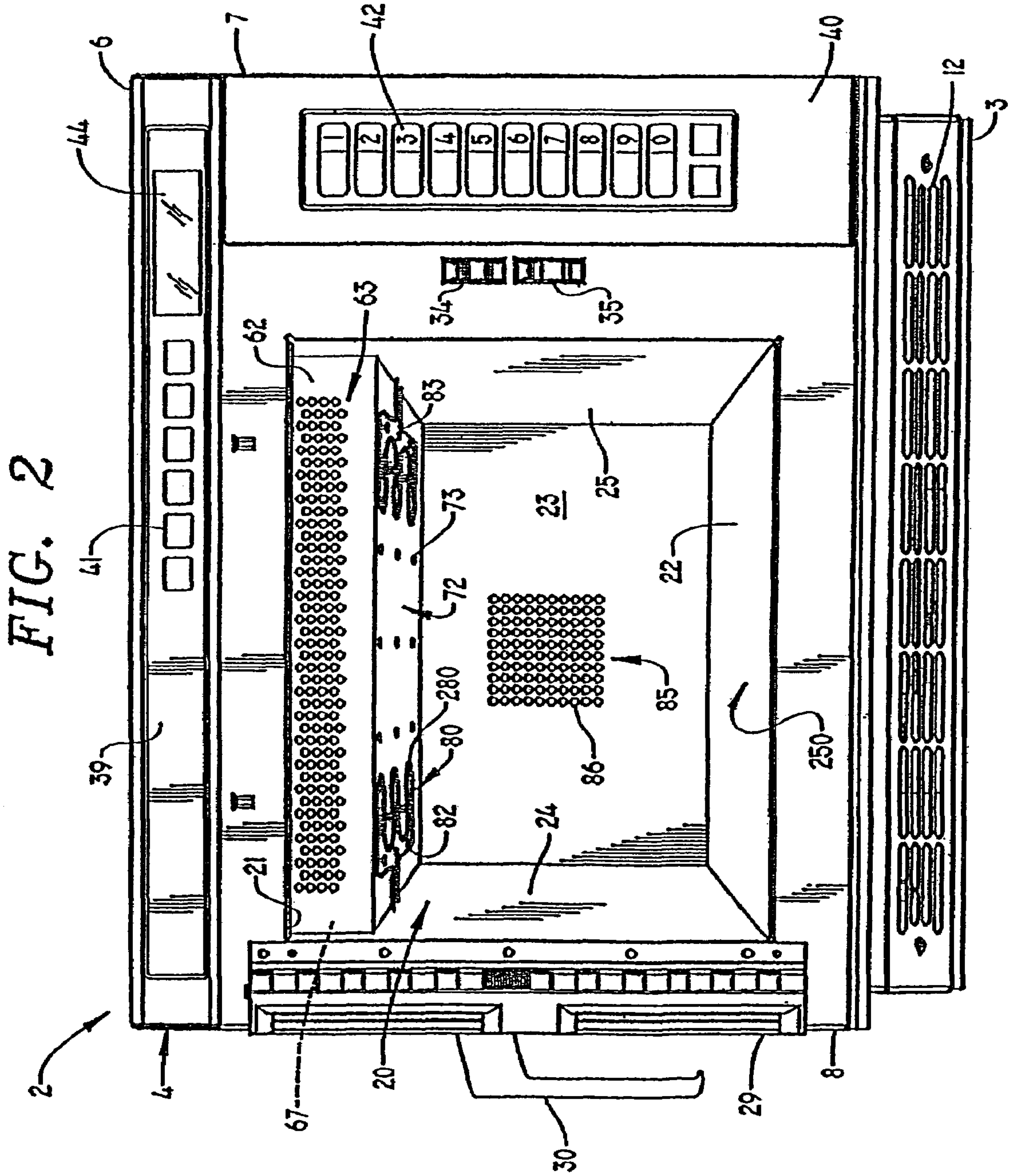
FIG. 2 is a front view of the cooking appliance of FIG. 1 with a cooking chamber of the appliance exposed.
Figure 3:
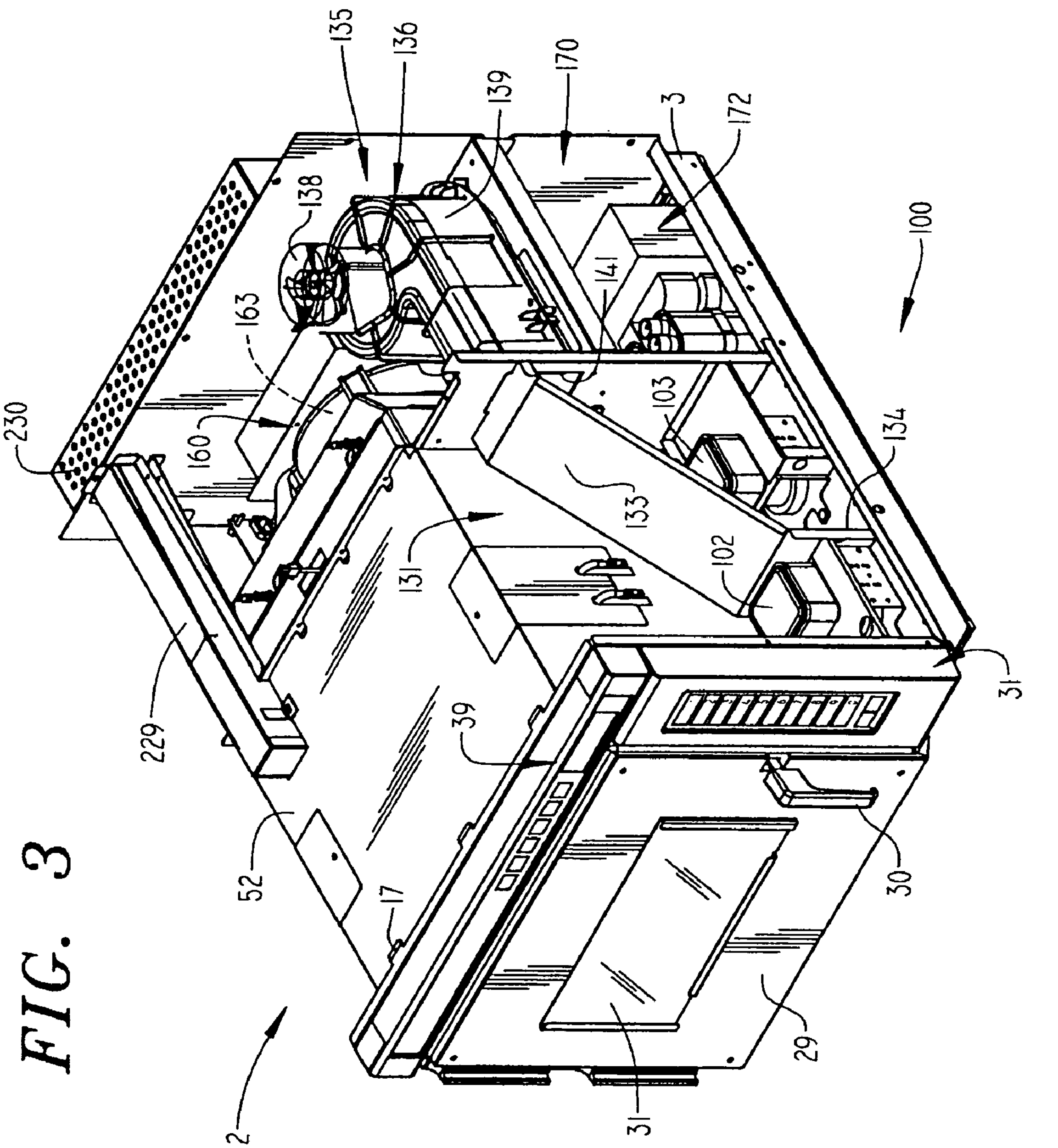
FIG. 3 is an upper right perspective view of the cooking appliance of FIG. 1 with an outer cabinet portion of the appliance removed.

With initial reference to FIGS. 1–3, a cooking appliance constructed in accordance with the present invention is generally indicated at 2. As shown, cooking appliance 2 includes a base frame 3 to which is secured an outer cabinet shell 4 having top and opposing side panels 6–8. Cooking appliance 2 is also provided with a front face or wall 9 and a rear panel 10. Arranged at a lower portion of front wall 9 is an intake air vent 12 through which, as will be discussed more fully below, an ambient air flow enters into cabinet shell 4. In addition, cabinet shell 4 includes a plurality of air discharge vents, indicated generally at 14, arranged on side panel 7. Vents 14 enable cooling air to exit from within cooking appliance 2, thereby removing heat from within cabinet shell 4. Cabinet shell 4 is secured over base frame 3 through a plurality of fasteners 16, with the fasteners 16 arranged along front wall 9 being secured at tabs 17 (see FIG. 3).

As best seen in FIG. 2, arranged within cabinet shell 4 is a cooking chamber 20 having top, bottom, rear and opposing side walls 21–25. In a manner known in the art, a door 29 is pivotally mounted to front wall 9 to selectively enable access to cooking chamber 20. Toward that end, door 29 includes a handle 30 and a window 31 for viewing the contents of cooking chamber 20 during a cooking operation. Although not shown, window 31 includes a screen that prevents microwave energy fields from escaping from within cooking chamber 20 during a cooking operation. In the embodiment shown, handle 30 is adapted to interconnect to upper and lower latching mechanisms 34 and 35 so as to retain door 29 in a closed position. In addition, latching mechanisms 34 and 35 serve as an interlock that prevents operation of cooking appliance 2 whenever door 29 is opened.

Cooking appliance 2 is shown to include upper and side control panels 39 and 40, each of which includes a respective set of control buttons or elements 41 and 42. The sets of control elements 41 and 42, in combination with a digital display 44 and a controller or CPU 45, enable a user to establish particular cooking operations for cooking appliance 2. For instance, control elements 41 can be used to establish the heating parameters of cooking appliance 2, while control elements 42 enable stored cooking times and/or operations to be readily selected. Since the general programming of cooking appliance 2 does not form part of the present invention, these features will not be described further herein.

As further shown in FIG. 2, cooking appliance 2 includes a plenum cover 62 arranged at an upper portion of cooking chamber 20. As will be discussed more fully below, plenum cover 62 includes a plurality of openings, indicated generally at 63, that enable an exhaust air flow to pass from cooking chamber 20. Arranged behind plenum cover 62 is a bifurcated air plenum 67 (see FIG. 4) that provides air flow management for cooking chamber 20 during a cooking operation. More specifically, an air emitter plate 72 extends rearward from a lower portion of plenum cover 62 to rear wall 23 of cooking chamber 20. In accordance with a preferred embodiment of the invention, air emitter plate 72 includes a plurality of strategically placed openings 73 that are exposed to a lower portion of bifurcated plenum 67. A radiant heating device 80, including first and second radiant heating elements 82 and 83 (see FIG. 2), preferably extends along air emitter plate 72. More specifically, radiant heating elements 82 and 83 are constituted by sheathed, electric resistive elements, each having a serpentine-like pattern that extends fore-to-aft across a section of air emitter plate 72. In the most preferred embodiment, each heating element 82, 83 is capable of delivering 900 watts of energy into cooking chamber 20. More preferably, each heating element 82, 83 is configured to produce 60 watts/in$^2$ of power. Cooking appliance 2 also includes a convection air intake vent 85 having a plurality of convection air openings 86 positioned on rear wall 23 of cooking chamber 20.

Figure 4:
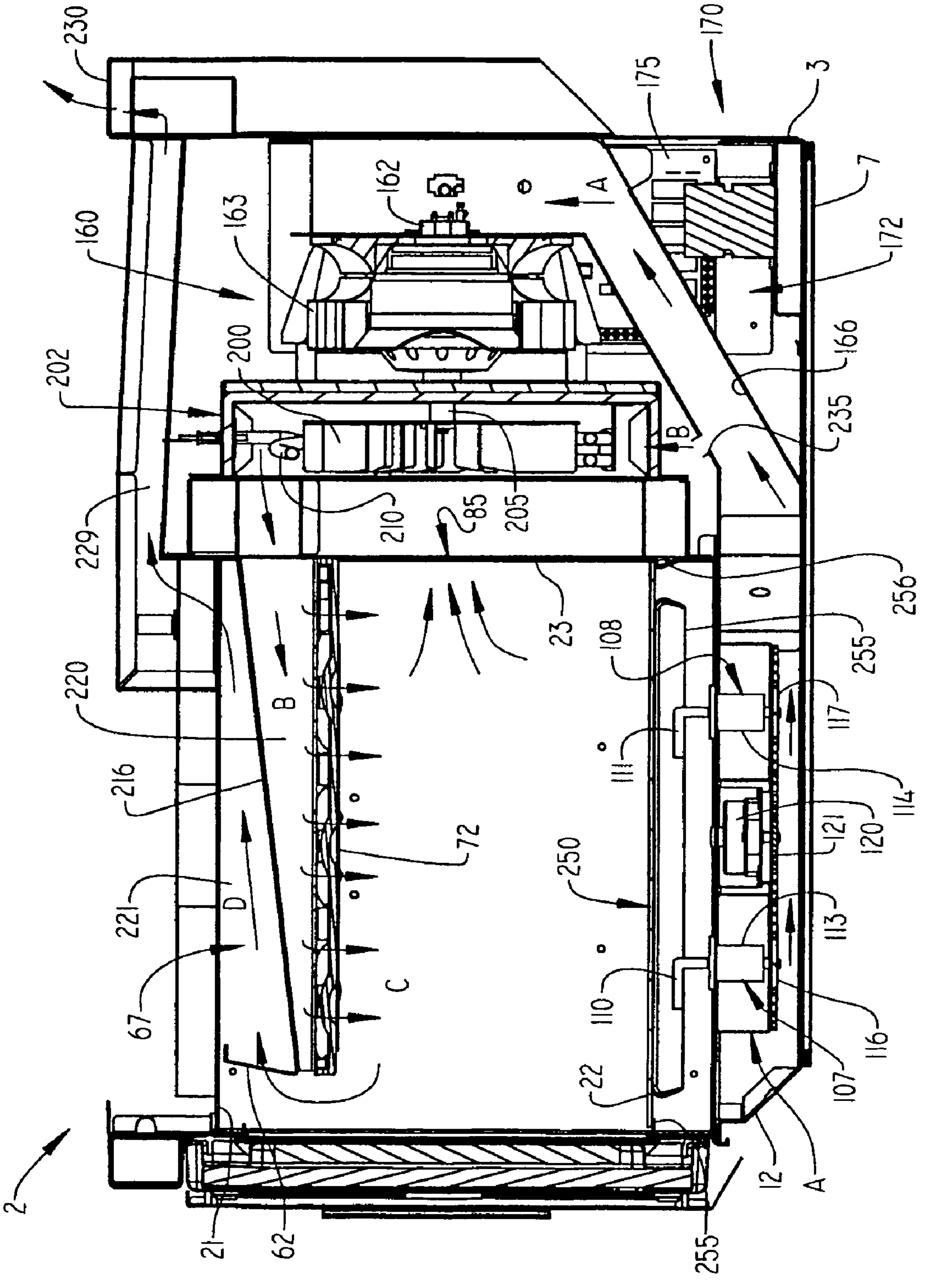
FIG. 4 is a cross-sectional side view of the cooking appliance constructed in accordance with the present invention.

As shown best with reference to FIGS. 3 and 4, cooking appliance 2 includes a microwave heating device 100 incorporating first and second magnetrons 102 and 103 (see FIG. 3) that are adapted to generate and direct a combined microwave energy field into cooking chamber 20. As seen in FIG. 4, first and second magnetrons 102 and 103 include respective first and second rotating antenna assemblies 107 and 108. Each rotating antenna assembly 107, 108 includes an antenna portion 110, 111, a housing portion 113, 114 and a gear member 116, 117 respectively. In accordance with a preferred form of the invention, antenna assemblies 107 and 108 are arranged below bottom wall 22 of cooking chamber 20. In further accordance with the invention, antenna portions 110 and 111 are rotated so as to develop a uniform, constructive standing microwave energy field within cooking chamber 20. That is, antenna assemblies 107 and 108 are rotated by a drive motor 120 having a drive gear 121 which is drivingly connected to each of gears 116 and 117 of antenna assemblies 107 and 108, preferably through a gear train (not shown).

Referring to FIG. 3, magnetrons 102 and 103 are arranged in a microwave housing portion 131 of cooking appliance 2. Microwave housing portion 131 includes an angled divider 133 and a vertical divider 134. Although not shown, vertical divider 134 is formed with an opening leading beneath magnetron 102. In order to prevent magnetrons 102 and 103 from overheating, cooking appliance 2 is provided with a microwave cooling system 135 that includes a blower assembly 136 which is drivingly connected to a drive motor 138 positioned within a duct 139. Duct 139 extends from drive motor 138 to an opening 141 arranged below angled divider 133. With this arrangement, activation of cooking appliance 2 causes drive motor 138 to rotate, whereby blower assembly 136 establishes a cooling air flow. The cooling air flow is guided through opening 141 toward magnetron 103 due to the presence of angled divider 133. The cooling air flow circulates about magnetron 103, through vertical divider 134, across magnetron 102 and up along angled divider 133, in order to provide a cooling effect for magnetrons 102 and 103, before exiting cooking appliance 2 through vents 14.

In addition to microwave cooling system 135, cooking appliance 2 includes an air intake system 160 having an associated drive motor 162 coupled to an impeller 163. Drive motor 162 rotates impeller 163 so as to draw in an ambient air flow A through intake air vent 12. Intake air vent 12 leads to an intake air duct 166, while passing about drive motor 120 for antenna assemblies 107 and 108. A majority of the air flow A is circulated within a rear control housing portion 170 in order to cool a plurality of electronic components 172, including a main control board 175 which is adapted to receive input and/or programming instructions through control elements 41, 42 in order to establish and set various cooking operations for cooking appliance 2.

In addition to driving impeller 163, drive motor 162 operates a convection fan 200 positioned within a convection fan housing 202 that, in the embodiment shown, is arranged behind rear wall 23 of cooking chamber 20. More specifically, convection fan 200 is drivingly connected for concurrent rotation with impeller 163 through a drive shaft 205 such that operation of drive motor 162 is translated to convection fan 200 to establish a convective air flow B. Convective air flow B is passed over a convection air heating element 210 and delivered into cooking chamber 20 through openings 73 in air emitter plate 72. More specifically, as will be discussed further below, convective air flow B is directed into bifurcated air plenum 67 before passing into cooking chamber 20.

In further accordance with the preferred form of the invention, bifurcated air plenum 67 includes an angled divider plate 216 that defines a tapered air delivery portion 220 and a corresponding tapered exhaust portion 221. In the embodiment shown, air delivery portion 220 is essentially defined by air emitter plate 72, angled divider plate 216 and part of rear wall 23, while exhaust portion 221 is defined by plenum cover 62, top wall 21 and angled divider plate 216. In any event, air flow B developed through operation of convection fan 200 is heated by heating element 210, directed into air delivery portion 220 of bifurcated air plenum 67 and then lead into cooking chamber 20 through openings 73. The tapering of air delivery portion 220 is provided so that air initially entering bifurcated air plenum 67 from convection fan 200 passes through openings 73 in air emitter plate 72 with substantially the same pressure as air reaching an end portion (not separately labeled) of tapered air delivery portion 220.

As a portion of the cooking operation is constituted by convection heating, convective air flow B circulates about cooking chamber 20. This heated air flow has been found to particularly enhance the even cooking of a food item. As further represented in FIG. 4, a first portion of convective air flow B passes into convection air intake vent 85 through openings 86. The convective air flow B is heated/reheated by heating element 210 before being passed back into cooking chamber 20. At the same time, a second, preferably smaller portion of convective air flow B passes through openings 63 in plenum cover 62 and is directed out of cooking appliance 2. More specifically, plenum cover 62 leads into tapered exhaust portion 221. The exhaust air flow D entering into tapered exhaust portion 221 is passed upward into an exhaust duct 229 before exiting through an exhaust outlet 230 that, in the embodiment shown, is arranged at an upper rear portion of cooking appliance 2. To replace the lost air flow, convection fan 200 preferably draws or siphons a portion of air flow A. For this purpose, one or more openings 235 are provided in duct 166 in order to introduce fresh ambient air to the overall, circulating air flow. In this manner, certain cooking effluents, including moisture and steam, exit cooking chamber 20 through exhaust outlet 230, while a fresh supply of air is introduced into the remaining, recirculated air flow due to the presence of opening(s) 235.

In further accordance with the present invention, cooking appliance 2 includes a conductive heating device 250 that, in the most preferred form of the invention, defines bottom wall 22 of cooking chamber 20. Conductive heating device 250 is preferably constituted by a ceramic stone plate adapted to support food items within cooking chamber 20. Conductive heating device 250 advantageously provides a thermal conduction path for heating and browning of a food item. More specifically, upon activation of cooking appliance 2, radiant heat produced by heating elements 82 and 83 combines with convective air flow B generated by convection fan 200 to heat conduction heating device 250. Conductive heating device 250 is transparent to microwave energy so that microwave energy fields emitted by magnetrons 102 and 103 pass upward into cooking chamber 20 and further contribute to the overall cooking operation. In further accordance with the invention, conductive heating device 250 is supported upon a plurality of support brackets, such as those indicated at 255 and 256, to enable or facilitate removal of conductive heating device 250 for cleaning or other purposes.

Figure 5:
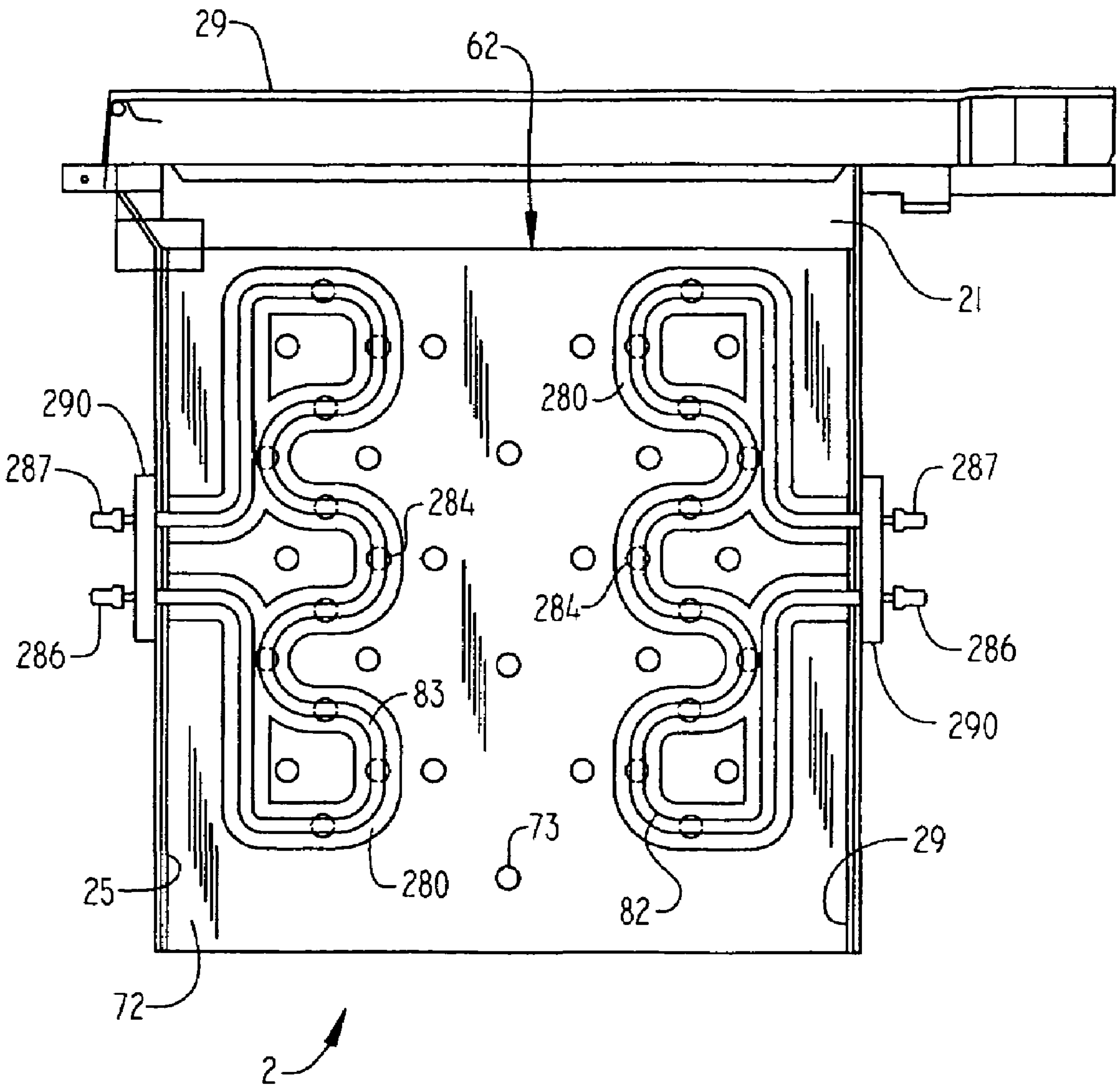
FIG. 5 is a plan view of a top portion of a cooking chamber of the appliance.

With particular reference to FIG. 5, air emitter plate 72 is preferably formed from anodized cast aluminum and provided with a pair of fore-to-aft extending recessed channels 280. Recessed channels 280 are provided with a plurality of openings 284. Heating elements 82 and 83 are nested within recessed channels 280 adjacent openings 284. As shown, each heating element 82, 83 includes a pair of electrodes 286 and 287 spaced from side walls 24 and 25 by an insulator 290. With this mounting arrangement, not only do heating elements 82 and 83 provide a source of radiant heat, but convective air flow B passing through openings 284 is heated by the additional thermal energy generated by heating elements 82 and 83 as air flow B passes from air delivery portion 210 of air plenum 67 into cooking chamber 20. Therefore, by being routed between, across and around respective ones of the various strategically placed openings 284, heating elements 82 and 83 evenly distribute thermal and infrared energy to the food being cooked.

With this overall combined cooking arrangement, a food item, for example, an open-faced sandwich placed within cooking chamber 20, can be exposed to a four-way combination cooking operation, i.e. radiant, microwave, convection and conductive heating techniques. The combination of the aforementioned heating techniques serves to cook the food item in an expeditious manner, while maintaining the required food quality. In addition, combining the aforementioned heating techniques enables cooking appliance 2 to be readily adapted to cook a wide range of food items in an efficient and effective manner, while also establishing an overall compact unit.

Figure 6A:
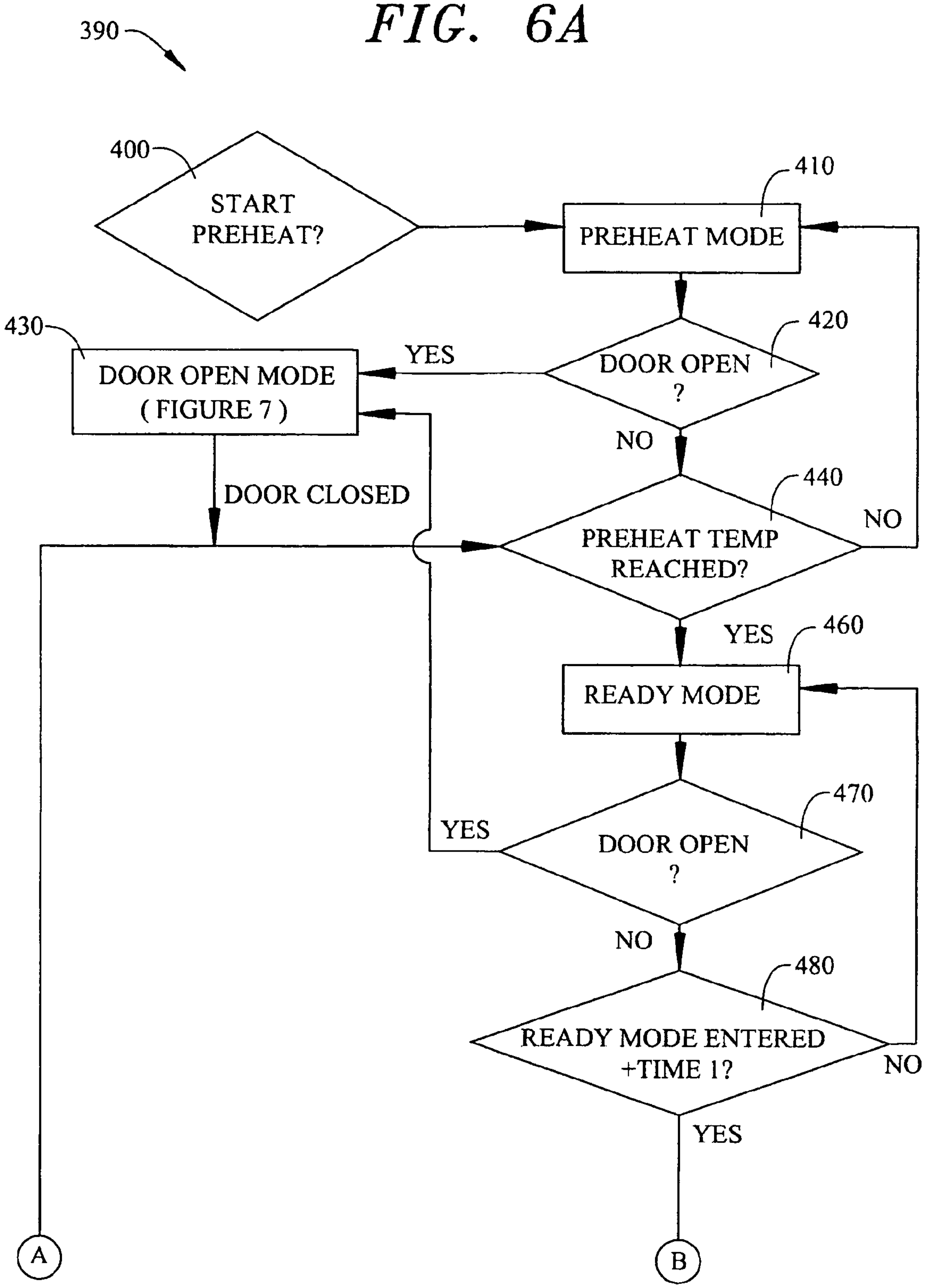
FIG. 6A is a first portion flow-chart representing the operational mode of the combination cooking system of the present invention.
Figure 6B:
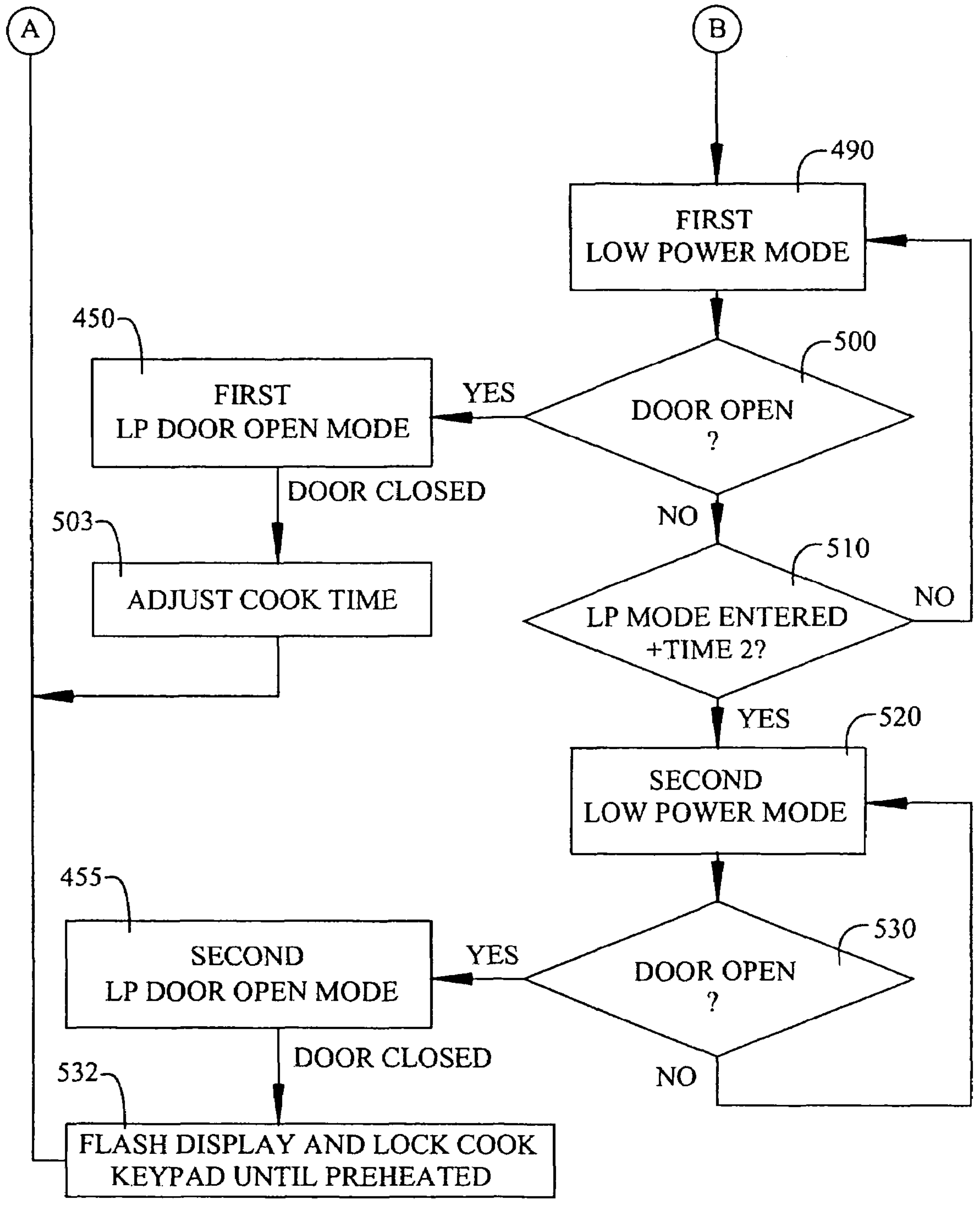
FIG. 6B is a second portion of the flow chart of FIG. 6A.
Figure 7:
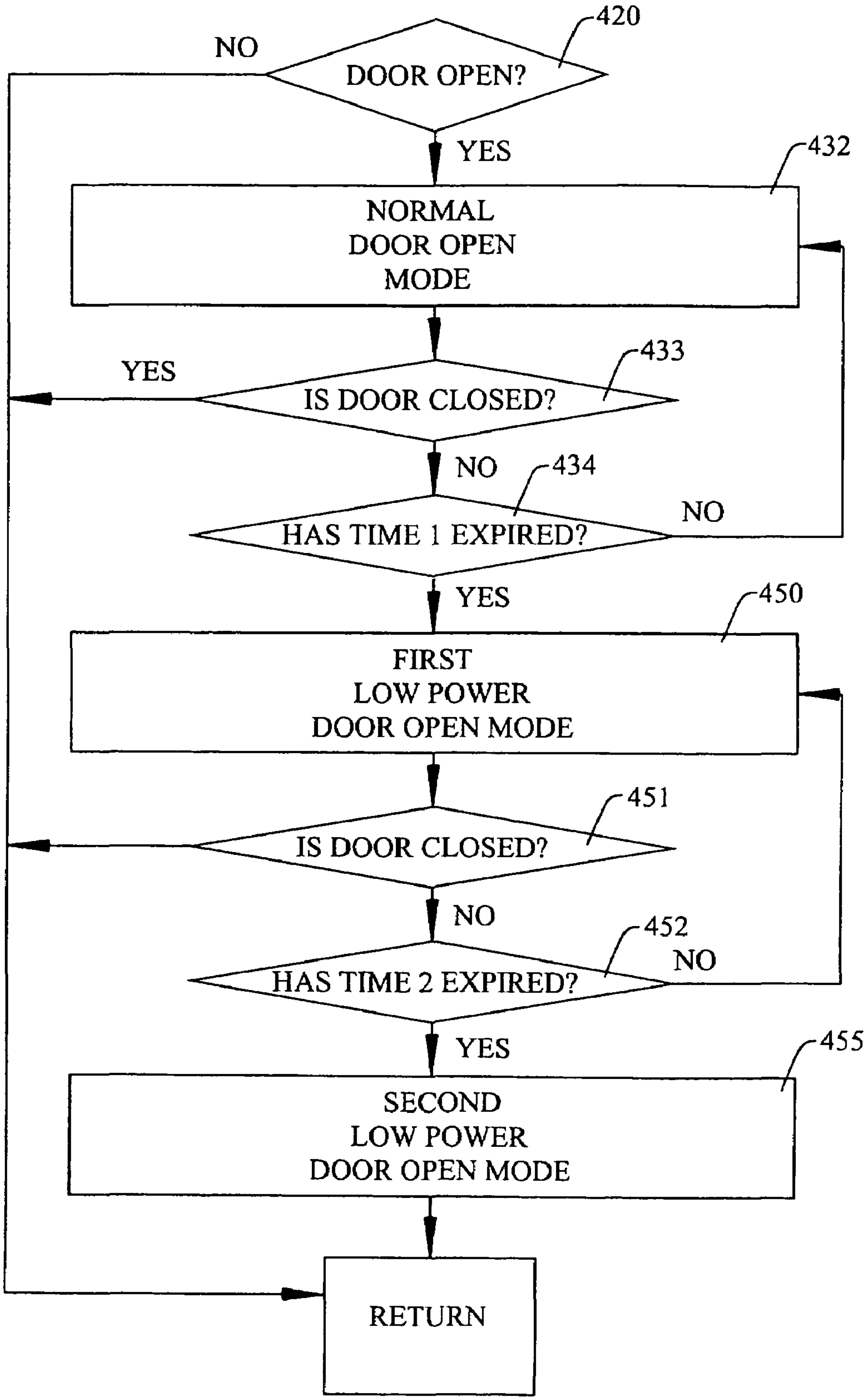
FIG. 7 is a flow-chart representing a door open mode of operation for the combination cooking appliance of the present invention.

Having described a preferred construction of cooking appliance 2 of the present invention, reference will now be made to FIGS. 6–7 in describing a preferred control algorithm indicated generally at 390. Initially, cooking appliance 2 is activated through manipulating one of the plurality of control elements 41 or 42 to start a cooking operation as represented in step 400. At this point, CPU 45 initiates a preheat mode indicated at step 410. During the pre-heat mode (step 410), CPU 45 preferably activates radiant device 80, convention fan 200 and convection heating element 210 at full power in order to establish a selected temperature within oven cavity 20. While in the preheat mode, CPU 45 checks to see whether door 29 has been opened in step 420. In connection with the invention, numerous methods of sensing whether door 29 is or has been opened can be employed. One preferred method is set forth in U.S. patent application Ser. No. 10/991,941 entitled "Door Position Sensing System for Cooking Appliance Including Combination Heating System" filed Nov. 19, 2004, which is incorporated herein by reference. In any event, if CPU 45 determines that door 29 has been opened, control algorithm 390 transitions into a door open mode in step 430, with the door open mode being detailed in FIG. 7. If door 29 is opened at an initial stage of the pre-heat or cooking operation, the door open mode (step 430) commences at a normal door open mode in step 432. During the normal door open mode (step 432), CPU 45 operates radiant device 80, convection fan 20 and convection heating element 210 at a first power level or setting. Depending upon particular selections made, the first power level or setting can be set to simply maintain the selected temperature in oven cavity 20 or at lower settings in order to reduce heat loss when door 29 is opened. At this point, CPU 45 checks whether door 29 has closed in step 433.

If door 29 has not been closed after expiration of a first predetermined door open time as represented in step 434, CPU 45 shifts to a first low power door open mode in step 450. When operating in the first low power door open mode (step 450), radiant device 80, convection fan 20 and convection heating element 210 are activated at a first low power or second setting. In this manner, the oven is powered down slightly to conserve energy, but not so much so that re-establishing the selected temperature will substantially extend the cooking process. While in the first low power door open mode (step 450), CPU 45 determines whether door 20 remains open in step 451. If door 29 is not closed after a second predetermined period of time (step 452), CPU 45 shifts to a second low power door open mode in step 455. While in the second low power door open mode (step 455), CPU 45 operates radiant device 80, convection fan 20 and convection heating element 210 at a second low power level or third setting to further conserve energy. At this point, CPU 45 will maintain the second low power door open mode of operation until door 29 is closed, whereupon operation of cooking appliance 2 returns to control algorithm 390.

After returning to control algorithm 390, CPU 45 determines whether the selected temperature has been established in oven cavity 20 in step 440. If not, cooking appliance 2 continues pre-heating. However, once the selected temperature has been reached, CPU 45 automatically shifts to a ready mode of operation as indicated in step 460. During the ready mode (step 460), the heat output of radiant device 80 and the speed of convection fan 200 can be set to any desired level (preferably reduced), while convection heating element 210 cycles, to maintain the selected temperature. Preferably, the outputs of radiant device 80 and convection fan 200 are established by phase firing corresponding semiconductors 462 and 463 that are operatively associated with radiant device 80 and convection fan 200 (see FIG. 1). In addition to lowering the heat output of radiant device 80 and speed of convection fan 200, the output of convection heating element 210 is reduced, preferably by cycling an associated relay 464 (also see FIG. 1). In the ready mode (step 460), CPU 45 also determines whether door 29 has been opened in step 470. If open, operational control algorithm 390 shifts to the door open mode (step 430) and, when door 29 is sensed to be closed, a cooking operation is initiated to cook a food item within oven cavity 20. At this point, it should be noted that, in addition to radiant device 80, convection fan 200 and convection heating element 210, microwave cooking techniques can be employed through the activation of microwave heating device 100. In fact, a wide range of heating sources could be employed, either individually or in combination.

If it is determined that door 29 is not open in the ready mode (step 470 in FIG. 6A), CPU 45 senses whether a first time period has expired in step 480. CPU 45 can sense the expiration of the first time period using a variety of methods, such as through the use of an incremental or decremental counter, other timing devices or the like. If the first time period has not yet expired, cooking appliance 2 continues operation in the ready mode. If, however, the first time period has expired, CPU 45 automatically transitions to a first low power mode in step 490 to conserve energy (see FIG. 6B).

In the first low power mode (step 490), the heat output by radiant device 80 and the speed of convection fan 200 are once again reduced by phase firing semiconductors 462 and 463 associated with radiant device 80 and convection fan 200. Likewise, the heat output by convection heating element 210 is also reduced, preferably by cycling relay 464. While in the first low power mode (step 490), CPU 45 again determines whether door 29 has been opened in step 500. If so, control algorithm 390 shifts to the first low power door open mode (step 450). Once door 29 is closed, the first low power door open mode (step 450) shifts back to the control algorithm 390. At the same time, an overall cook time is adjusted in step 503 to account for any heat that may have escaped from oven cavity 20 when door 29 was open. If door 29 has not been opened after a second predetermined period of time when checked in step 510, CPU 45 automatically switches to a second low power mode of operation in step 520.

In a manner similar to that described above, when in the second low power mode (step 520), the heat output by radiant device 80 and speed of convection fan 200 are again reduced by phase firing semiconductors 462 and 463 and the heat output by convection heating element 210 is reduced by cycling relay 464. In this manner, the energy consumed by cooking appliance 2 can be further reduced in the event that a food item is not placed within oven cavity 20 after an extended period of time. While in the second low power mode, CPU 45 senses whether door 29 has been opened in step 530. If so, control algorithm 390 shifts to the second low power door open mode (step 455).

In accordance with the most preferred embodiment of the invention, if door 29 is opened while in the second low power door open mode (step 455), display 44 is flashed and control button elements 41 and 42 are locked out (step 532) until CPU 45 operates radiant device 80, convection fan 200 and convection heating element 210 to re-establish the preset or selected oven cavity temperature. If door 29 is not opened while in the second low power door open mode (step 455), cooking appliance continues to operate in a manner so as to conserve the overall energy consumed by the various heating devices.

In further accordance with the most preferred embodiment of the invention, each of the upper and lower temperature limits associated with the ready mode (step 460), the first low power mode (step 490) and the second low power mode (step 520) is user adjustable. That is, while the initial values are preferably pre-set, the end user can adjust and tailor operation of the cooking appliance to suit particular needs and operating environments. Likewise, each of the various time delays can be adjusted to suit specific needs of the end user. In this manner, the cooking appliance can be individually tailored, while still minimizing the consumption of energy.

Although described with reference to a preferred embodiment of the present invention, it should be readily apparent to one of ordinary skill in the art that various changes and/or modifications can be made to the invention without departing from the spirit thereof. For instance, although preferred operations are established for the convection heater, radiant heater and convection fan throughout door open conditions, it should be realized that the convection heater, radiant heater and convection fan could be adjusted to various levels as desired. That is, they can be increased to maintain cavity temperature or reduced to minimize the escaping of heat depending on the desired operation. In general, the invention is only intended to be limited by the scope of the following claims.

What is claimed is:

1. A cooking appliance comprising:

an oven cavity including top, bottom, rear and opposing side walls that define a frontal opening;

a door pivotally mounted relative to the oven cavity for selectively closing the frontal opening;

at least one heating device for heating the oven cavity;

a control element for selecting a desired temperature for the oven cavity; and a controller for selectively operating the at least one heating device in one of a plurality of operational modes based upon an initial selected oven cavity temperature and a time in which the door is in a predetermined position.

2. The cooking appliance according to claim 1, wherein the operational modes include a pre-heat mode, a ready mode, a first low power mode and a second low power mode.

3. The cooking appliance according to claim 2, wherein the at least one heating device includes a radiant heating device arranged in the oven cavity, a convection fan for directing a convective airflow into the oven cavity, and a convection heating device for heating the convective airflow.

4. The cooking appliance according to claim 3 wherein, during the pre-heat mode, the controller operates each of the radiant heating device, the convection fan and the convection heating device at full power so as to establish a selected temperature in the oven cavity.

5. The cooking appliance according to claim 4, wherein the controller automatically transitions from the pre-heat mode to the ready mode once the selected temperature is established in the oven cavity.

6. The cooking appliance according to claim 4, wherein, during the ready mode, the controller reduces both an amount of heat output by the radiant heating device and a speed of the convection fan, while cycling operation of the convection heating device, to maintain the selected temperature.

7. The cooking appliance according to claim 6, wherein the controller maintains the selected temperature of the oven cavity between an upper temperature limit and a lower temperature limit, said upper and lower temperature limits being associated with the selected temperature.

8. The cooking appliance according to claim 7, wherein the upper and lower temperature limits are adjustable.

9. The cooking appliance according to claim 3, wherein the controller automatically transitions from operating in the ready mode to operating in the first low power mode if the door of the appliance is not opened for a predetermined period of time.

10. The cooking appliance according to claim 9, wherein the predetermined period of time is adjustable.

11. The cooking appliance according to claim 9, wherein, during the first low power mode, the controller automatically reduces both an amount of heat output by the radiant heating device and a speed of the convection fan, while cycling operation of the convection heating device, to establish a first low temperature, said first low temperature being lower than the selected temperature.

12. The cooking appliance according to claim 11, wherein the controller maintains the first low temperature of the oven cavity between an upper temperature limit and a lower temperature limit, said upper and lower temperature limits being associated with the first low temperature.

13. The cooking appliance according to claim 12, wherein the upper and lower temperature limits associated with the first low temperature are adjustable.

14. The cooking appliance according to claim 11, wherein the controller automatically transitions from operating in the first low power mode to operating in the second low power mode if the door of the appliance is not opened for a predetermined period of time, said predetermined period of time being associated with the first low power mode.

15. The cooking appliance according to claim 14, wherein the predetermined period of time associated with the first low power mode is adjustable.

16. The cooking appliance according to claim 14, wherein, during the second low power mode, the controller reduces both an amount of heat output by the radiant heating device and a speed of the convection fan while cycling operation of the convection heating device, to establish a second low temperature, said second low temperature being lower than the first low temperature.

17. The cooking appliance according to claim 16, wherein the controller maintains the second low temperature of the oven cavity between an upper temperature limit and a lower temperature limit, said upper and lower temperature limits being associated with the second low temperature.

18. The cooking appliance according to claim 17, wherein the upper and lower temperature limits associated with the second low temperature are adjustable.

19. The cooking appliance according to claim 16, wherein the controller phase fires a semi-conductor to reduce heat output by the radiant heating device.

20. The cooking appliance according to claim 16, wherein the controller phase fires a semi-conductor to reduce the speed of the convection fan.

21. The cooking device according to claim 16, wherein the controller signals a relay to cycle operation of the convection heater.

22. The cooking device according to claim 3, wherein the at least one heating device further includes a microwave heating device adapted to perform a portion of the cooking operation.

23. The cooking device according to claim 2, wherein the operational modes further include a first low power door open mode, said first low power door open mode being activated if the door is opened during the first low power mode.

24. The cooking device according to claim 23, wherein the controller automatically adjusts a cook time upon termination of the first low power door open mode.

25. The cooking device according to claim 23, wherein the operational modes further include a second low power door open mode, said second low power door open mode being activated if the door is opened during the second low power mode.

26. The cooking device according to claim 25, wherein the controller locks out the control element upon completion of the second low power door open mode, said control element remaining locked out until the oven cavity has returned to the desired temperature.

27. A cooking appliance comprising:

an oven cavity including top, bottom, rear and opposing side walls that define a frontal opening;

a door pivotally mounted relative to the oven cavity for selectively closing the frontal opening;

at least one heating device for heating the oven cavity;

a control element for selecting a desired temperature for the oven cavity; and means for operating the at least one heating device in one of a plurality of distinct operational modes, with at least two of the plurality of operational modes being operable only when the door is open.

28. The cooking appliance according to claim 27, wherein the operational modes include a pre-heat mode, a ready mode, a first low power mode and a second low power mode, a first low power door open mode and a second low power door open mode.

29. The cooking device according to claim 28, wherein the controller automatically adjusts a cook time upon termination of the first low power door open mode.

30. The cooking device according to claim 28, wherein the controller locks out the control element upon completion of the second low power door open mode, said control element remaining locked out until the oven cavity has returned to the desired temperature.

31. A method of operating a cooking appliance having an oven cavity comprising:

selecting a desired temperature for a cooking operation through at least one control element;

initiating a pre-heat operational mode during which at least one heating device is operated at substantially full power to establish the desired temperature in the oven cavity;

switching to a ready mode after the desired temperature is established;

maintaining the desired temperature between upper and lower temperature limits;

sensing whether a door of the appliance has been opened;

switching to a first low power mode if the door of the appliance is not opened for a first predetermined period of time, wherein the at least one heating device is operated in the first low power mode so as to establish a temperature in the oven cavity which is lower than the desired temperature; and switching to a second low power mode if the door of the appliance is not opened for a second predetermined period of time, said second low power mode establishing a temperature for the appliance which is lower than the temperature established in the first low power mode.

32. The method of claim 31, wherein the desired temperature is maintained between the upper and lower temperature limits by reducing a heat output level of a radiant heating device and a speed of a convection fan, while also cycling a convection heating device.

33. The method of claim 32, further comprising: independently adjusting each of the first and second predetermined periods of time.

34. The method of claim 32, wherein the heat output by the radiant heating device is reduced by phase firing a semi-conductor.

35. The method of claim 31, further comprising: switching to a first low power door open mode if the door of the appliance is opened during the first low power mode.

36. The method of claim 35, further comprising: automatically adjusting a cook time once the first low power door open mode is terminated.

37. The method of claim 31, further comprising: switching to a second low power door open mode if the door of the appliance is opened during the second low power mode.

38. The method of claim 37 wherein, following the second low power door open mode, the at least one control element is locked out until the oven cavity returns to the desired temperature.

* * * * *